US011631346B2

(12) United States Patent
Maunula (10) Patent No.: US 11,631,346 B2
(45) Date of Patent: Apr. 18, 2023

(54) ARRANGEMENT AND METHOD FOR MANAGING AN ELECTRONIC PRICE LABEL, AND AN ELECTRONIC PRICE LABEL SYSTEM

(71) Applicant: MARIELLA LABELS OY, Vantaa (FI)

(72) Inventor: Vesa Maunula, Helsinki (FI)

(73) Assignee: MARIELLA LABELS OY, Vantaa (FI)

( * ) Notice: Subject to any disclaimer, the term of this patent is extended or adjusted under 35 U.S.C. 154(b) by 23 days.

(21) Appl. No.: 16/330,524

(22) PCT Filed: Sep. 6, 2017

(86) PCT No.: PCT/FI2017/050627
§ 371 (c)(1),
(2) Date: Mar. 5, 2019

(87) PCT Pub. No.: WO2018/046798
PCT Pub. Date: Mar. 15, 2018

(65) Prior Publication Data
US 2019/0228684 A1    Jul. 25, 2019

(30) Foreign Application Priority Data

Sep. 8, 2016   (FI) .................................... 20165673

(51) Int. Cl.
*G09F 3/20*    (2006.01)
*H04B 5/00*    (2006.01)
(Continued)

(52) U.S. Cl.
CPC ............. *G09F 3/208* (2013.01); *G06K 7/015* (2013.01); *G06K 7/10* (2013.01); *G06K 19/07* (2013.01);
(Continued)

(58) Field of Classification Search
USPC ......................................................... 705/16
See application file for complete search history.

(56) References Cited

U.S. PATENT DOCUMENTS 6,764,002 B1 * 7/2004 Zimmerman ........ G06Q 20/201
235/383
8,061,601 B1 * 11/2011 Harkins ................. G06Q 30/06
235/383
(Continued)

FOREIGN PATENT DOCUMENTS

CN      105550615 A    5/2016
JP      2015-106249 A  6/2015
(Continued)

OTHER PUBLICATIONS

International Search Report (PCT/ISA/210) issued in PCT/FI2017/050627, dated Jan. 3, 2018.
(Continued)

*Primary Examiner* — Luna Champagne
(74) *Attorney, Agent, or Firm* — Birch, Stewart, Kolasch & Birch, LLP

(57) ABSTRACT

An electronic price label system, an apparatus and a method for managing an electronic price label are disclosed. The electronic price label includes a display and communication device. In the method, the identifier in an electronic price label is read and, based on the read identifier, a command is sent to the electronic price label by means of a near field. The command can be an emptying command and/or extinguishing command for an electronic price label or it can be a command containing a new state and/or price.

20 Claims, 4 Drawing Sheets (51) Int. Cl.
  *H04W 4/35*      (2018.01)
  *G06K 19/077*    (2006.01)
  *G06K 7/015*     (2006.01)
  *G06K 7/10*      (2006.01)
  *G06Q 30/06*     (2012.01)
  *G06K 19/07*     (2006.01)

(52) U.S. Cl.
  CPC ....... *G06K 19/07707* (2013.01); *G06Q 30/06* (2013.01); *H04B 5/00* (2013.01); *H04B 5/0031* (2013.01); *H04B 5/0056* (2013.01); *H04B 5/0081* (2013.01); *H04W 4/35* (2018.02)

(56) References Cited

U.S. PATENT DOCUMENTS

| | | |
|---|---|---|
| 2003/0222139 A1 | 12/2003 | Stephenson et al. |
| 2005/0173527 A1 | 8/2005 | Conzola |
| 2007/0181678 A1* | 8/2007 | Nilsson .................. G06F 3/147 235/383 |
| 2007/0210922 A1 | 9/2007 | Clifford et al. |
| 2015/0035674 A1 | 2/2015 | Karhuketo |
| 2016/0004891 A1* | 1/2016 | Moon ................. G06K 7/10198 340/10.51 |
| 2017/0148077 A1* | 5/2017 | Phillips ................ G06Q 10/087 |

FOREIGN PATENT DOCUMENTS

| | | | | |
|---|---|---|---|---|
| WO | WO-2014148272 A1 * | 9/2014 | ............. | G06F 3/147 |
| WO | WO 2016/072703 A1 | 5/2016 | | |
| WO | WO-2017177599 A1 * | 10/2017 | ............... | G06K 7/00 |

OTHER PUBLICATIONS

Written Opinion (PCT/ISA/237) issued in PCT/FI2017/050627, dated Jan. 3, 2018.
English translation of Russian Office Action and Search Report for Russian Application No. 2019108807, dated Jan. 18, 2021.
English_JPOA_201 9512798—dated—Oct. 26, 2021; pp. 1-2.

* cited by examiner

ARRANGEMENT AND METHOD FOR MANAGING AN ELECTRONIC PRICE LABEL, AND AN ELECTRONIC PRICE LABEL SYSTEM

FIELD OF THE INVENTION

The invention relates to an arrangement and a method for managing an electronic price label, and also to an electronic price label system.

BACKGROUND OF THE INVENTION

The price information of price labels in retail stores has conventionally been changed manually always when the price of a product changes. New prices are printed onto paper or onto a corresponding material and these labels, with their new price markings, are manually disposed in a location reserved for price labels on the shelves in sales premises. Thus, an employee must first find the correct location of the price label to be updated, after which the previous price label is taken out and discarded and the new price label is placed into its position. A drawback of this solution is inter alia that the solution is very laborious and very prone to error. When an error occurs, a situation can arise e.g. in which there is conflicting price information between the price information of the price labels on the shelves and the price information in the checkout system.

To avoid the aforementioned drawbacks, electronic systems have been developed that comprise electronic display units, with electronic displays, on the front edges of shelves or on the products, and the product price information on the displays of these units can be changed centrally from the control center of the system. This makes the updating of price information much easier and much faster. Depending on the system, the information on the displays can be updated by wireline or wirelessly. A problem in wireline systems is that a conductor connection for data transfer, and possibly also for power supply, must be arranged to each display. Since normal stores selling fast-moving consumer goods have a very large number of displays, there must also be a large number of conductors, which causes problems and places limitations on e.g. the placement of price displays.

Complex wirings are not needed in wireless systems, but correspondingly such systems need transmitter-receivers provided with antennas in connection with battery-powered or accumulator-powered price displays, by means of which transmitter-receivers they communicate with the control unit of the system via suitable communications means.

One method in endeavoring to minimize the electricity consumption of the display units, and thus to lengthen the operating time of their batteries/accumulators, is that in the communication between base stations and display units the transmitter-receiver disposed in the display units does not itself implement active radio transmission, whereby the transmission power would be produced on the basis of the display unit's own power source, but instead the display unit only reflects the radio transmission of the base station back at a certain time and in a certain way. A display unit can change the reflectance of its own antenna, in which case the display unit can acknowledge or respond to base station messages with simple response messages. The following gives a general overview of this type of messaging method.

The base stations communicate with the display units by sending signals that all the display units listen to and from which signals an individual display unit identifies a command addressed specifically to it on the basis of the identifier specific to that display unit. After receiving a command addressed to itself, the individual display unit responds to the base station by reflecting the base station's own transmission back to the base station modified by the amount of the phase shift caused by a certain time delay and at a certain moment in time. Typically, after sending a command intended for a certain price display, a base station starts to send for a certain time e.g. a certain type of carrier wave, which the price display that identified the command reflects back with a certain phase shift. A base station is thus able to identify a reflection response as belonging to a certain price display because it is able to wait for a certain period of time after the individualized command it sends to the display in question. The base station can distinguish from its own transmission the reflection response of considerably weaker power than the transmission, based on the phase shift produced in it by the display device.

Modern radio-based wireless electronic price label systems are in power-saving mode for most of the time in order to minimize energy consumption. They switch from power-saving mode to listening mode/receiving mode at certain predefined intervals and only then can a message addressed to an electronic label be received by the electronic price label. That being the case, a problem in modern electronic price label systems is that messages and commands that are intended for an electronic price label do not reach the electronic price label immediately but instead at a predetermined time after the electronic price label has awoken from power-saving mode.

BRIEF DESCRIPTION OF THE INVENTION

The purpose of the solution according to the invention is to eliminate the problems of prior art. The method according to the invention is characterized by what is stated in the characterization part of claim 1. The method according to the invention is also characterized by what is stated in claims 2-5. The apparatus according to the invention is characterized by what is stated in the characterization part of claim 6 regarding the apparatus. The method according to the invention is also characterized by what is stated in the characterization part of claims 7-15 regarding the method. The system according to the invention is characterized by what is stated in claim 16.

In the solution according to the invention the identifier in an electronic price label is read and, based on the read identifier, a command is sent to the electronic price label by means of a near field. In the solution according to one embodiment of the invention the command is an emptying command and/or extinguishing command for an electronic price label or it is a command containing a new state and/or price. The visible and/or invisible information, e.g. the pages to be presented or the data of pages, of an electronic price label can e.g. be removed by means of an emptying command. Correspondingly data can be added to an electronic price label, e.g. to its memory locations or memory pages, when the electronic price label is paired with a product.

In one embodiment of the invention the identifier of an electronic price label is an optically readable identifier, such as a barcode. In one embodiment of the invention the identifier of an electronic price label is arranged essentially at the point of the antenna of the electronic price label, e.g. essentially at the point of the center point of the antenna as viewed from the front of the electronic price label, or face-to-face with the center point of the antenna.

In one embodiment of the invention a change event, emptying event and/or extinguishing event of an electronic price label is recorded in a database.

In one embodiment of the invention the apparatus according to the invention is arranged in such a way that reading of the identifier in an electronic price label only succeeds from an area that is also an area in which communication with an electronic price label functions by means of a near field. By means of the solution according to the invention, therefore, an electronic price label is aligned, e.g. mechanically and/or optically, to an area in which the sending of a command implemented by means of a near field is executed. In such a case, it can be ensured that the electronic price label is in an optimal location for a command sending event. Alignment in the desired location can be ensured e.g. by means of reading a barcode.

In one embodiment of the invention the apparatus is arranged in connection with the checkout register.

The solution according to the invention now presented has some significant advantages when it is compared to prior-art solutions. The solution presented by this invention is faster in transmitting to a price label a message or command intended for it than prior art systems using a radio path because electronic price labels are typically in receiving mode for only a certain period of time in order to minimize power consumption. In such a case, a command transmitted by radio only reaches the electronic price label when the price label switches from power-saving mode to listening/receiving mode, e.g. only after a number of minutes from when the command is registered for transmission. Since a command in the solution of the present invention is sent by means of a near field, a message or command intended for an electronic price label can be transmitted to the price label essentially at the same time as the time of sending the command.

Another advantage of the invention is that by means of it the alignment time needed for reading the identifier of an electronic price label as well as for aligning the corresponding near field can be reduced. For example, in an embodiment of the invention in which a location is formed for the electronic price label, into which location the electronic price label is placed for a reading event and for the sending of a command taking place by means of a near field, the apparatus according to the invention also forces a reader of the identifier of the electronic price label into the correct location. The same advantage is also achieved in an embodiment wherein successful alignment of an electronic price label is ensured by reading an identifier, e.g. a barcode, on the electronic price label.

BRIEF DESCRIPTION OF THE FIGURES

In the following, the invention will be described in more detail by the aid some embodiments with reference to the drawings 1-3, wherein.

DETAILED DESCRIPTION OF THE INVENTION

Figure 1:
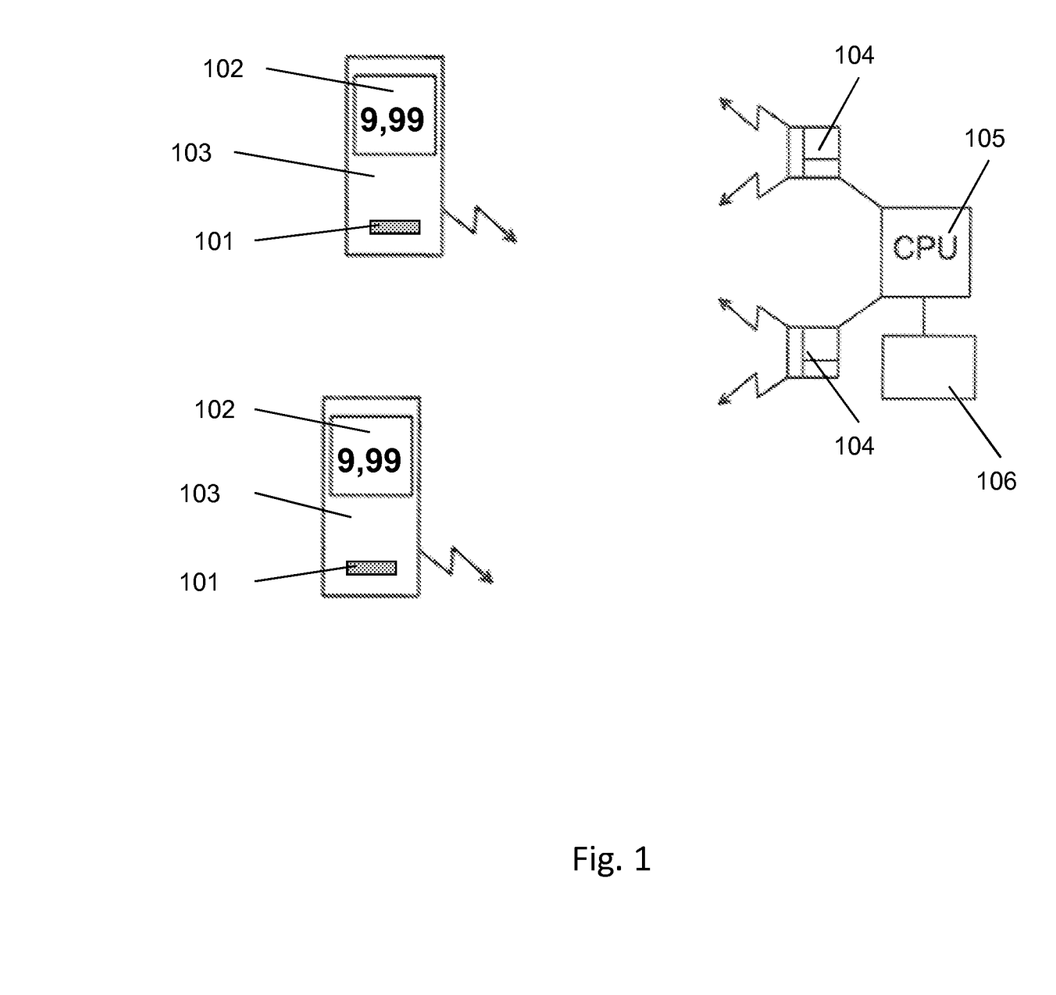
FIG. 1 presents a diagrammatic and simplified electronic price label system according to one embodiment of the invention.

FIG. 1 presents in a diagrammatic and simplified form the arrangement according to the invention, which arrangement can be used e.g. in a retail store or in corresponding sales premises. Electronic price labels 103 can be affixed to products and/or to shelves. The display 102 of the electronic price labels is arranged to show information relating to a product, such as e.g. price, product name and possibly some other information relating to the product. Electronic price labels can communicate with the rest of the system via base stations 104.

The display of an electronic price label can be implemented e.g. as an electronic laminated display, which forms a thin price label provided with display segments and similar in appearance to a paper price label, on which the information relating to a product, e.g. the prices of products together with other needed markings, are presented by changing the color of the display segments. One layer of the display is e.g. an active ink layer. In the ink layer are numerous microcapsules filled with liquid, which microcapsules contain e.g. essentially black particles that are positively surface-charged and essentially white particles that are negatively surface-charged, the placement of which particles in the microcapsules is controlled with an electrical field such that for the desired display segments the black particles are at the top, in which case those display segments appear to be black when viewed from above, and for the other display segments the white particles are at the top, in which case these display segments appear to be pale when viewed from above. The background of the display consists of the same microcapsules, so that e.g. price information can be presented as dark numbers against a light background or, if desired, vice versa. For example, the electrophoretic microcapsule laminated display presented in Finnish patent application no. FI 20050192 can be used as this type of display.

The electronic price label system according to the invention can comprise, in addition to electronic price labels, at least communication means 106, such as a central unit 105 provided with a radio transmitter, via which e.g. updated price information and other control data can be sent via the base stations 104 of the system to the electronic price labels 103. In addition, it has been possible to connect to the system scanners that are at the checkout registers, said scanners scanning the price of a product and connected to the checkout system, in which case the checkout system and the electronic price labels always have the same up-to-date information about the prices of products. The central unit 105 can be further connected to other controlling systems or supporting systems. The wireless connection between the central unit 105 and the electronic price labels 103 is described with arrows.

Use of the invention is not limited to price displays using the display technology of the type described above, but instead it is obvious that the price displays can be implemented using any technology whatsoever that is per se known in the art. The invention relates explicitly to how electronic price labels can be managed.

In the following one example of what e.g. an electronic price label 103 affixable to a product can be like is presented in more detail. A receiver provided with a display controller connected to a display 102 and with an antenna is affixed to an electronic price label 103, and so also is a power source that is e.g. an ordinary battery. The power source is arranged to provide electrical energy to the electronic price label and to its display controller. The price information or other information visible on the display 102 can be updated wirelessly from the central unit 105 via the receiver and display controller. In this embodiment, the update information and control information is transferred by means of radio waves, but other data transfer modes are possible. Each electronic price label 103 forms a thin price label, provided with a display, similar in appearance to a paper price label, on which the necessary prices of products, together with other needed markings, are formed by changing the color of the display segments. The color of the display segments and also of the background is changed by means of an electrical field formed by an electric current, as is described above.

In the following, the communication of an electronic price label with a base station by means of a reflection between the unit in question and the system wirelessly controlling it will be described in slightly more detail.

In the example arrangement, the electronic price label 103 has state changing means for changing the state of the antenna of the receiver between at least two states, in which e.g. in the first state the reflectivity of the antenna is good and in the second state the reflectivity is poor. Correspondingly, the antenna states can be adapted with the state changing means in such a way that in different states the antenna reflects radio waves in different phases. In this case, therefore, the electronic price label is adapted to change the state of the antenna of its receiver in order to produce a coded reflection in a certain manner with a different time delay according to the state of the antenna. The communication means 6 connected to a base station 104 interpret different time delays as coded data signals sent by an electronic price label 103, and e.g. the communication means 6 identify each electronic price label based on these data signals.

The aforementioned coding at its simplest is that an electronic price label 103 reflects back the carrier wave transmitted by the communication means 106, which carrier wave can have a frequency of e.g. 685 MHz, in such a way that the electronic price label 103 earths the receiver antenna by means of the state changing means e.g. at a frequency of 150 kHz, thus forming a certain type of square wave from the reflected signal. The electronic price label 103 thus affects the reflected signal by changing the state of the antenna. In this reflection, the phase shift undergone by the signal would most suitably be 180 degrees, at which detection of a low-power reflection with the communication means 106 is at its best. Electronic price labels are in power-saving mode for most of the time and at times change their state to receiving mode. In receiving mode, they can detect messages sent to them and execute commands given to them.

An electronic price label to be used in the solution of the invention has an identifier, such as e.g. an optically readable identifier, e.g. a barcode. In one embodiment of the invention the identifier of an electronic price label is arranged essentially at the point of the antenna of the electronic price label, e.g. essentially at the point of the center point of the antenna as viewed from the front of the electronic price label, or face-to-face with the center point of the antenna.

In the solution of the invention a command can be given by means of a near field to an electronic price label operating on a radio frequency. In this case, in the solution according to the invention the identifier in an electronic price label is read and, based on the read identifier, a command is sent to the electronic price label by means of a near field. This also succeeds when the electronic price label is in power-saving mode. In the solution according to one embodiment of the invention the command is an emptying command and/or extinguishing command for an electronic price label.

The solution of the invention is faster than sending a command to be executed by radio via base stations, because typically electronic price labels are in receiving mode for only a certain interval of time in order to minimize power consumption. In such a case, a command transmitted by radio only reaches the electronic price label when the price label switches from power-saving mode to listening/receiving mode, e.g. only after a number of minutes from when the command is registered for transmission.

One idea of the solution of one embodiment of the invention is also that the reading of an identifier and the sending of a command by means of a near field to an electronic price label occur essentially simultaneously, e.g. within an essentially short time, such as e.g. within 0.01-2 seconds, so it can be ensured that sending of the command succeeded and that the command was sent before the electronic price label is transferred out of the area operating by means of the near field. In one embodiment of the invention a command is sent to a price label at the same time as the identifier, e.g. a barcode, arrives in the reading range of the identifier, e.g. into the reading range of an optical beam, and the reading event is executed. After a successful reading event and sending of a command, the device according to the invention being used to manage an electronic price label gives an indicator signal of the successful reading event, e.g. a sound signal or light signal. In one embodiment of the invention an electronic price label can also acknowledge it has received a command, e.g. by sending an acknowledgement message or by changing the signs and/or colors of the display of the electronic price label.

In the solution of the invention e.g. an optical reader can be used in reading the identifier of an electronic price label. The examples presented below are described using an optical reader, but in the solutions presented in the application the optical reader can be replaced with also some other type of reader or with a device that can read the identifiers of an electronic price label.

In the solution according to the invention the location and interpositioning of the antennas transmitting to an electronic label by means of the optical identifier reader and near field must be correctly arranged. A transmitting antenna may not be too close to an electronic price label because an excessively strong signal in such a case can damage the electronic price label. Conversely, an antenna may not be too far away from an electronic price label because otherwise the signal is too weak for the electronic price label. The power level of a signal received by an electronic price label must therefore be within predetermined minimum and maximum levels. The transmission level of the signal must thus be adjusted in such a way that it is at a suitable reading distance or in reading range of the identifier of the electronic price label such that reading of the signal succeeds in the electronic price label from a predetermined range. Neither may the signal be too strong in such a way that it could be received in an electronic price label that is outside the identifier reading range because in such a case a command sent to one electronic price label could also be received by other nearby electronic price labels.

In the solution of the invention, the antenna to be used in sending a command by means of a near field to an electronic price label and the optical reader can be arranged in many different ways. In one embodiment of the invention the antenna to be used in sending a command by means of a near field can be toroidal or rim-shaped, e.g. rectangular and/or of square shape. The optical reader can be disposed separately from the antenna or in connection with the antenna.

In one embodiment of the invention the antenna to be used in sending a command by means of a near field essentially surrounds the reader of the optical identifier. The reader can be e.g. in the center of the antenna and/or on the top edge of the antenna loop or in the center of the antenna loop. The beam of the optical reader can be directed in such a way that it passes through the loop of the antenna.

In one embodiment of the invention the antenna to be used in sending a command occurring via a near field and the optical reader can be on the same side of the electronic price label when the electronic price label is in a location and/or in an area from which reading of the identifier will succeed. In one embodiment of the invention the antenna and the optical reader can be on different sides of the electronic price label when the electronic price label is in a location and/or in an area from which reading of the identifier will succeed.

The reader and the means for sending a command to an electronic price label can be integrated into a single, e.g. portable, device. The reader and the means for sending a command to an electronic price label can be rigidly installed e.g. onto a planar surface and/or e.g. onto a table.

Figure 2A:
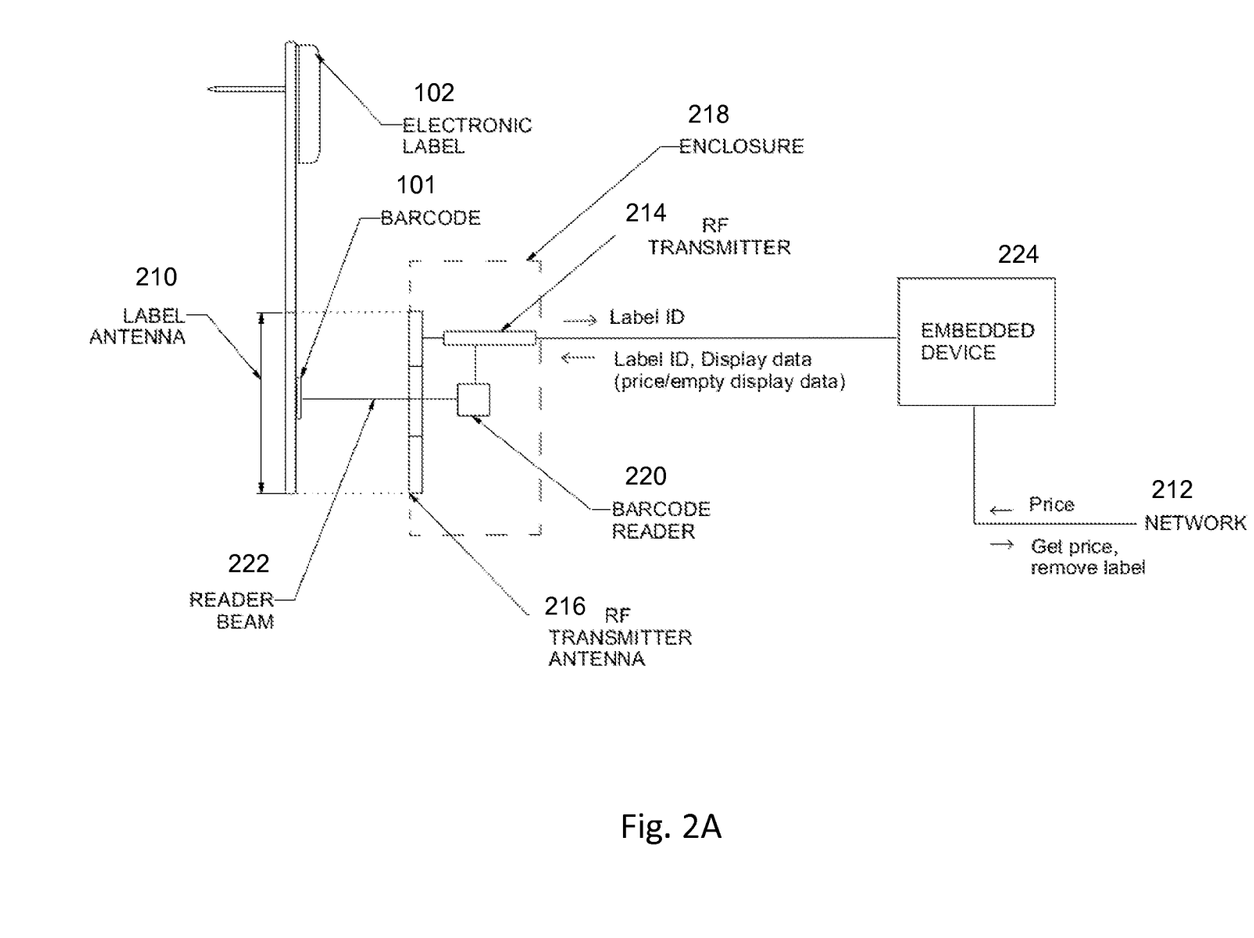
FIG. 2A presents a schematic side view of the arrangement according to one embodiment of the invention.

FIG. 2A presents a schematic side view of the apparatus according one embodiment of the invention. The apparatus comprises a reader of the identifier of an electronic price label, which reader is an optical reader 220, e.g. a barcode reader, in the embodiment of FIG. 2A. In addition to this, the apparatus comprises means for sending a command to an electronic price label by means of a near field. The aforementioned means can comprise an RF transmitter 214 and an RF transmitter antenna 216 suited for transmitting via a near field. The aforementioned parts can be fitted into a rigid entity, e.g. into an enclosure 218.

When the apparatus according to the invention apparatus is used, the electronic price label 102 is first taken into an area from which the identifier, e.g. barcode 101, of the electronic price label can be read. In the embodiment of FIG. 2A, this area is the range of the reader beam 222 of the optical reader 220. In this case also the antenna 210 of the electronic price label is at a suitable distance for transmitting via a near field from a suitable RF antenna 216. Based on the barcode reading event, information about the contents of the optical identifier of the label is sent to the central unit 224 of the apparatus. On the basis of this, the apparatus sends a command after this to the electronic price label by means of the near field via the RF transmitter 214 and the antenna 216 of the RF transmitter. The command can be a label emptying command, a label extinguishing command and/or a command specifying a new price or some other data. After sending the command, the central unit of the apparatus can send information about the changes in the state of the electronic price label that occurred and/or were executed onwards via the network 212, e.g. to a POS system. The apparatus can also receive information intended to be sent to a certain electronic price label via a network, e.g. from a POS system. This type of information can be e.g. price information to be shown on the display of the electronic price label or extinguishing information.

Figure 2B:
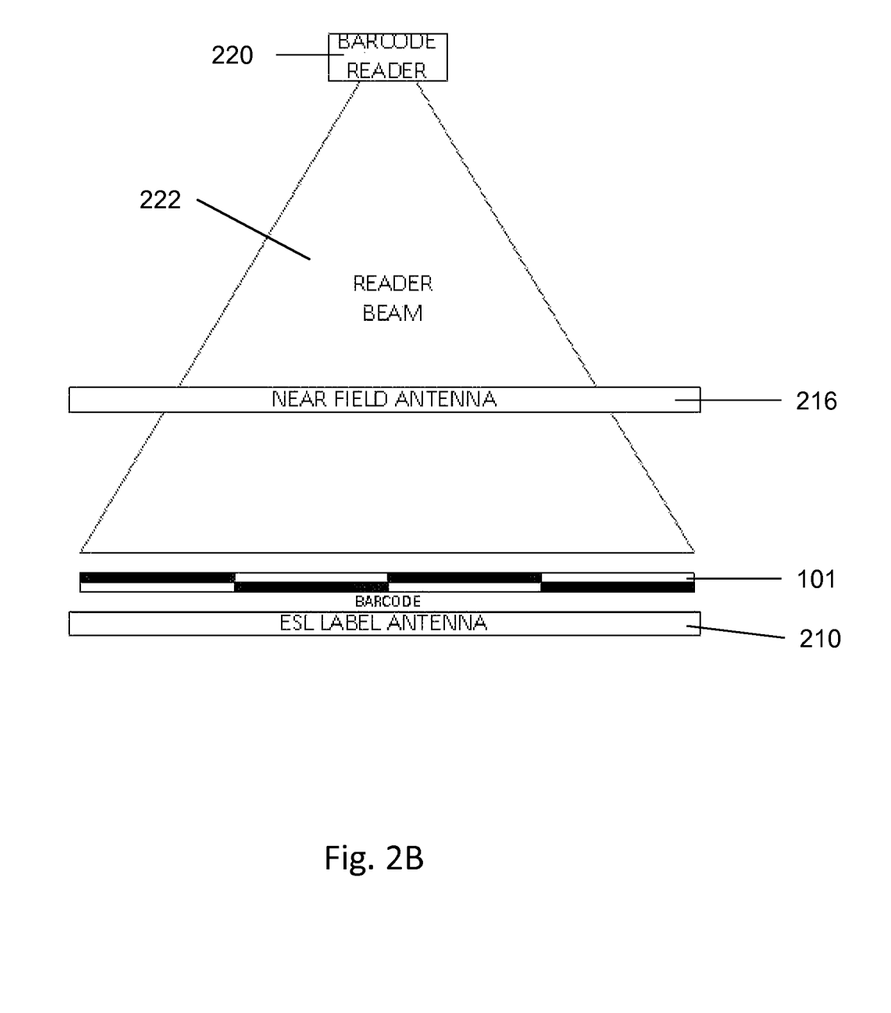
FIG. 2B presents a schematic top view of the arrangement according to one embodiment of the invention.

FIG. 2B presents a more detailed schematic top view of how the various components of the apparatus can be positioned in relation to each other in one embodiment of the invention. In this embodiment, the antenna 216 transmitting by the aid of a near field and the optical reader 220 are arranged in such a way that they are on the same side of the electronic price label when the electronic price label is in a location and/or in an area in which reading of the identifier will succeed. The measuring beam 222 of the optical reader 220 is arranged in this embodiment to travel through an antenna 216 shaped into a rectangular rim. The antenna 216 transmitting by means of a near field and the optical reader 220 are arranged in such a way that a reading event of an optical identifier, e.g. a barcode 101, of an optical reader can be performed only from that location from which an antenna 216 transmitting via a near field can successfully send a command via the antenna 210 of an electronic price label to the electronic price label. The device according to this embodiment can be used e.g. as a portable device, which is pointed at and/or taken to the point of the optical identifier of an electronic price label, and by means of which a command can then be sent to the electronic price label by means of a near field.

Figure 3:
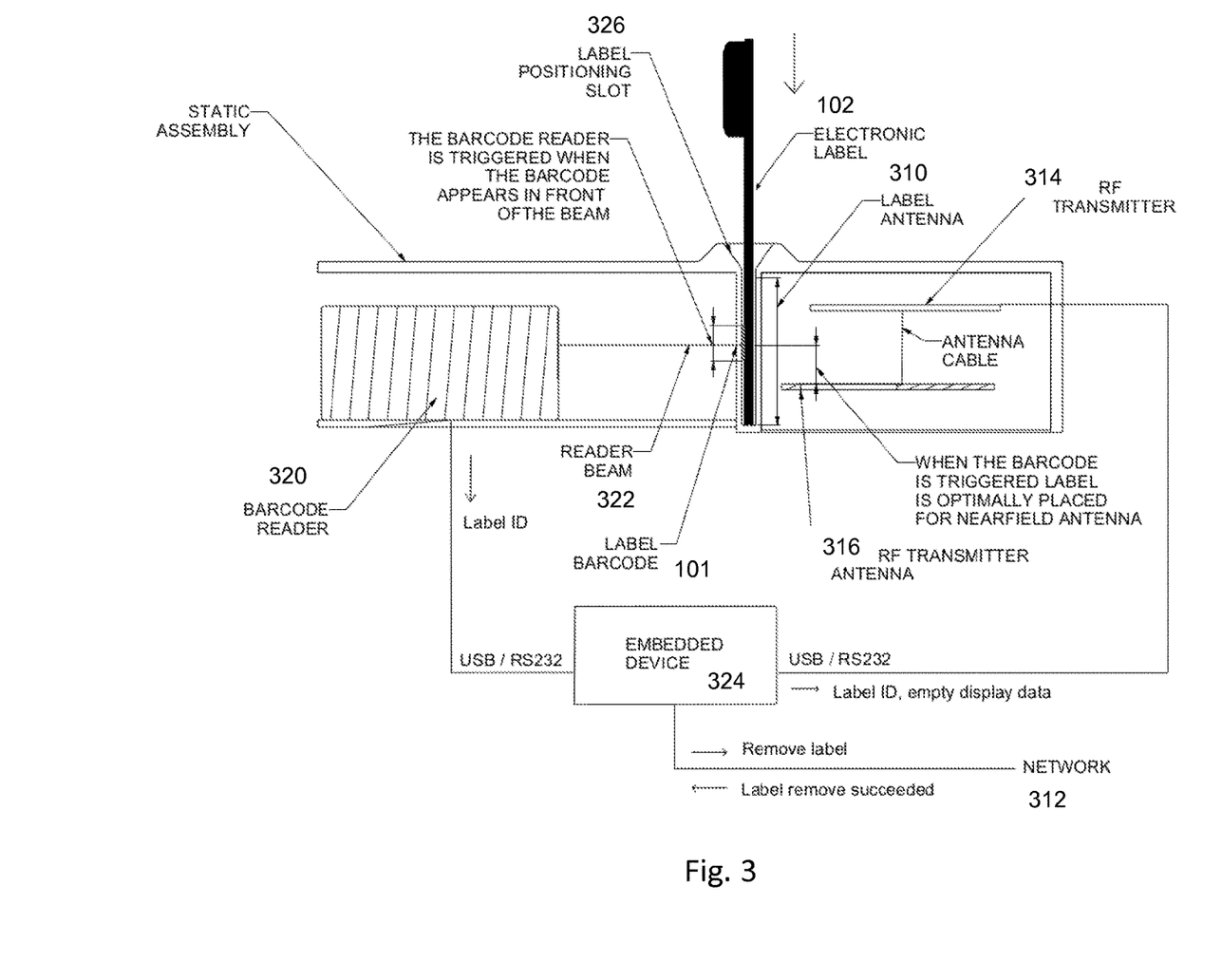
FIG. 3 presents an arrangement according to one embodiment of the invention.

In one embodiment of the invention a location is formed for the electronic price label, into which location the electronic price label is placed for sending a reading event and for the sending of a command taking place by means of a near field. FIG. 3 presents an example of an apparatus according to this embodiment of the invention, which is rigidly installable e.g. into connection with the checkout register. In this embodiment, the antenna 316 transmitting by the aid of a near field and the optical reader 320 are arranged in such a way that they are on different sides of the electronic price label 102 when the electronic price label is in an area from which reading of the identifier 101 will succeed. This area is formed into a recess 326, onto the base of which the electronic price label is placed when it is desired to send commands to it by means of a near field. The top part of the recess can be shaped to taper, in which case the tapering shape of the recess guides an electronic price label being placed onto the base of the recess into the correct position. The measuring range of the optical reader is arranged in such a way that when an electronic price label 102 is on the base of the recess, the identifier 101 of the electronic price label is in range of the measuring beam 322 of the optical reader 320. Also, the near field antenna 316 is arranged in such a way that when an electronic price label is on the base of the recess, the distance of the antenna 310 of the electronic price label from the antenna 226 transmitting by means of a near field is suitable for the sending of a command occurring via the near field. In this case the reading event of the identifier of the electronic price label succeeds, and based on this, a command can be sent to the electronic price label by means of the near field via the RF transmitter 314 and the antenna 316 of the RF transmitter. The event can proceed e.g. in such a way that the apparatus starts to send a command to the electronic price label by means of a near field immediately the identifier of the electronic price label being pushed into the recess slides into range of the reader beam of the optical reader. In one embodiment of the invention e.g. a barcode reader, which can be implemented by means of a laser, can be used as a reader of an optical identifier.

After sending the command, the central unit 324 of the apparatus can send information about the changes in the state of the electronic price label that occurred and/or were executed onwards via the network 312, e.g. to a POS system. The apparatus can also receive information intended to be sent to a certain electronic price label via a network, e.g. from a POS system. This type of information can be e.g. price information to be shown on the display of the electronic price label or extinguishing information.

In one embodiment of the invention individualizing identification data of an electronic price label is sent in association with a command, said data specifying for which electronic price label the command is intended. In one embodiment of the invention an electronic price label executes a command only if its own identification data corresponds to the identification data associated with the command.

In one embodiment of the invention some other command than an emptying command and/or an extinguishing command can be sent to an electronic price label. Thus, for instance, a command can be e.g. a command containing a new state and/or price, and in this case an electronic price label can e.g. be made to change its price and/or its state via a near field. Instead of the emptying commands or extinguishing commands presented in the examples above, also other commands can be sent to an electronic price label in the examples above.

In the solution of the invention a near field refers to data transfer and/or the sending of a command at close range. The maximum distance of the near field can be e.g. 20 cm, typically 4-5 cm. In the case of one embodiment of the invention, near field refers to a distance of 0-5 cm.

It is obvious to the person skilled in the art that the different embodiments of the invention are not limited solely to the examples described above, and that they may therefore be varied within the scope of the claims presented below. The characteristic features possibly presented in the description in conjunction with other characteristic features can also, if necessary, be used separately to each other.

The invention claimed is:

1. A method for managing an electronic price label, which electronic price label comprises a display and communication means, said method comprising the steps of:
   placing the electronic price label in a label positioning slot;
   reading an identifier in the electronic price label; and
   based on the read identifier, sending a command to the electronic price label by means of a near field, wherein the command is sent to the electronic price label at the same time as reading of the identifier of the electronic price label,
   wherein the command is an emptying command and/or extinguishing command for the electronic price label,
   wherein means for reading the identifier of the electronic price label and the means for sending a command are arranged in such a way that reading of the identifier in the electronic price label only succeeds when the electronic price label is aligned mechanically and/or optically to an area from which communication with the electronic price label functions by means of a near field,
   wherein the means for reading the identifier of the electronic price label includes a reader that optically reads the identifier of the electronic price label, the means for sending the command includes a transmitting antenna, and the electronic price label is aligned mechanically and/or optically to said area with respect to the reader and the transmitting antenna such that the transmitting antenna sends the emptying command and/or extinguishing command to the electronic price label via the near field at the same time as the reader reading the identifier of the electronic price label,
   wherein the transmitting antenna is arranged in such a manner that when the electronic price label is placed in the label positioning slot to make the identifier in the electronic price label successfully readable by the reader, the electronic price label is placed with respect to the transmitting antenna with a distance of a label antenna of the electronic price label from the transmitting antenna being suitable for sending the emptying command and/or extinguishing command from the transmitting antenna to the electronic price label via the near field, and
   wherein the emptying command and/or extinguishing command for the electronic price label is executed in conjunction with a purchasing event.

2. The method according to claim 1, wherein the identifier of the electronic price label is an optically readable identifier.

3. The method according to claim 1, wherein an emptying event and/or an extinguishing event of the electronic price label is recorded in a database.

4. The method according to claim 1, wherein the electronic price label communicates with an electronic price label system by means of radio-frequency communication.

5. The method according to claim 1, wherein a distance between the transmitting antenna and the antenna of the electronic price label is within a range from 0 cm to 5 cm.

6. The method according to claim 1, wherein the label positioning slot is installed in connection with a checkout register, the transmitting antenna and the reader are arranged on different sides of the electronic price label, a measuring range of the reader is arranged in such a way that when the electronic price label is on a base of the label positioning slot, the identifier of the electronic price label is in the measuring range of a measuring beam of the reader, the transmitting antenna is arranged in such a way that when the electronic price label is on the base of the label positioning slot, a distance of an antenna of the electronic price label from the transmitting antenna transmitting by means of the near field is suitable for the sending of the command occurring via the near field, the command is sent to the electronic price label by means of the near field immediately when the identifier of the electronic price label being pushed into the label positioning slot slides into the measuring range of the measuring beam of the reader, and a distance between the transmitting antenna and the antenna of the electronic price label is within a range from 0 cm to 5 cm, and
   wherein the method further comprises after the step of sending the command, a processor sends information about changes in a state of the electronic price label to a POS system, and receives information regarding price information to be shown on the display of the electronic price label or extinguishing information from the POS system.

7. The method according to claim 1, wherein individualizing identification data of the electronic price label is sent in association with the command, the individualizing identification data specifying for which electronic price label the command is intended, and the electronic price label executes the command only if an own identification data of the respective electronic price label corresponds to the individualizing identification data associated with the command.

8. An apparatus for managing an electronic price label, which electronic price label comprises a display and communication means, wherein the apparatus comprises:
   a label positioning slot;
   means for reading an identifier of the electronic price label; and
   means for sending a command to the electronic price label by the aid of a near field,
   wherein the apparatus is adapted to read the identifier in the electronic price label,
   wherein the apparatus is adapted to send a command, based on the read identifier, to the electronic price label by means of a near field, wherein the command is sent to the electronic price label at the same time as reading of the identifier of the electronic price label,
   wherein the command is an emptying command and/or extinguishing command for the electronic price label,
   wherein the means for reading the identifier of the electronic price label and the means for sending a command are arranged in such a way that reading of the identifier in the electronic price label only succeeds when the electronic price label is aligned mechanically and/or optically to an area from which communication with the electronic price label functions by means of a near field, wherein the means for reading the identifier of the electronic price label includes a reader that optically reads the identifier of the electronic price label, the means for sending the command includes a transmitting antenna, and the electronic price label is aligned mechanically and/or optically to said area with respect to the reader and the transmitting antenna such that the transmitting antenna sends the emptying command and/or extinguishing command to the electronic price label via the near field at the same time as the reader reading the identifier of the electronic price label, wherein the transmitting antenna is arranged in such a manner that when the electronic price label is placed in the label positioning slot to make the identifier in the electronic price label successfully readable by the reader, the electronic price label is placed with respect to the transmitting antenna with a distance of a label antenna of the electronic price label from the transmitting antenna being suitable for sending the emptying command and/or extinguishing command from the transmitting antenna to the electronic price label via the near field, and wherein the apparatus is configured to execute the emptying command and/or extinguishing command for the electronic price label in conjunction with a purchasing event.

9. The apparatus according to claim 8, wherein the identifier of the electronic price label is an optically readable identifier, and the means for reading the identifier of the electronic price label is an optical reading device.

10. The apparatus according to claim 8, wherein the apparatus is adapted to transmit data about an emptying event and/or about an extinguishing event of the electronic price label or to record said data in a database.

11. The apparatus according to claim 8, wherein the electronic price label is adapted to communicate with an electronic price label system by means of radio-frequency communication.

12. The apparatus according to claim 8, wherein the reader is arranged separately from the antenna.

13. The apparatus according to claim 8, wherein the reader is arranged in connection with the antenna.

14. The apparatus according to claim 8, wherein the antenna transmitting by the aid of the near field is rim-shaped or toroidal.

15. The apparatus according to claim 8, wherein the antenna transmitting by the aid of the near field and the optical reader are arranged in such a way that they are on the same side of the electronic price label when the electronic price label is in a location and/or in an area from which reading of the identifier will succeed.

16. The apparatus according to claim 8, wherein the antenna transmitting by means of the near field and the optical reader are arranged in such a way that they are on different sides of the electronic price label when the electronic price label is in a location and/or in an area from which reading of the identifier will succeed.

17. The apparatus according to claim 8, wherein the apparatus is arranged in connection with a checkout register.

18. An electronic price label system, comprising:
at least one base station; and
electronic price labels which are adapted to communicate with the base station using bidirectional communication,
wherein the system further comprises the apparatus according to claim 6 for managing the electronic price label.

19. The electronic price label system according to claim 18, wherein communication of the electronic price label system between at least one base station and the electronic price labels is adapted to take place as radio-frequency communication.

20. The electronic price label system according to claim 18, wherein the system is adapted for sending information relating to a product to the electronic price labels and the electronic price label is adapted to show on a display thereof the information received from a base station and relating to the product.

* * * * *